United States Patent [19]
Harasawa et al.

[11] Patent Number: 5,838,476
[45] Date of Patent: Nov. 17, 1998

[54] INPUT MONITORING SYSTEM FOR OPTICAL AMPLIFYING REPEATER

[75] Inventors: Shinichirou Harasawa; Hiroyuki Deguchi; Masuo Suyama, all of Kawasaki, Japan

[73] Assignee: Fujitsu Limited, Kanagawa, Japan

[21] Appl. No.: 541,788

[22] Filed: Oct. 10, 1995

[30] Foreign Application Priority Data

Mar. 17, 1995 [JP] Japan .................................. 7-059121

[51] Int. Cl.⁶ .......................... H04B 10/02; H04B 10/00
[52] U.S. Cl. .................... 359/177; 359/110; 359/160; 359/179; 359/341
[58] Field of Search .................................. 359/110, 134, 359/160, 177, 179, 341; 372/6

[56] References Cited

U.S. PATENT DOCUMENTS

| | | | |
|---|---|---|---|
| 5,299,048 | 3/1994 | Suyama | 359/179 |
| 5,475,521 | 12/1995 | Heidemann | 359/177 |
| 5,521,752 | 5/1996 | Heidemann et al. | 359/177 |

*Primary Examiner*—Kinfe-Michael Negash
*Attorney, Agent, or Firm*—Helfgott & Karas, PC.

[57] ABSTRACT

An input monitoring system is provided in an optical amplifying repeater to monitor a level of an optical input signal. A monitored level of the optical input signal is used to detect a fault on an optical transmission path or to control a bias current for a laser diode which emits and supplies an exciting signal for exciting an optical fiber amplifier. To accurately monitor a level of the optical input signal, the input monitoring system comprises an input terminal supplied with the optical input signal, an optical fiber amplifier for amplifying the optical input signal, a first photo diode for detecting and outputting an electric signal corresponding a level of the optical input signal, and an optical switch operatively connected to the input terminal, the optical fiber amplifier and first photo diode for switching the optical input signal alternatively into the optical fiber amplifier and the first photo diode.

10 Claims, 12 Drawing Sheets

INPUT MONITORING SYSTEM FOR OPTICAL AMPLIFYING REPEATER

BACKGROUND OF THE INVENTION

1. Field of the Invention

The present invention relates to an input monitoring system for an optical amplifying repeater, and more particularly to an input monitoring system for an optical amplifying repeater having an optical fiber amplifier for amplifying an optical signal.

2. Description of the Related Art

Figure 14:
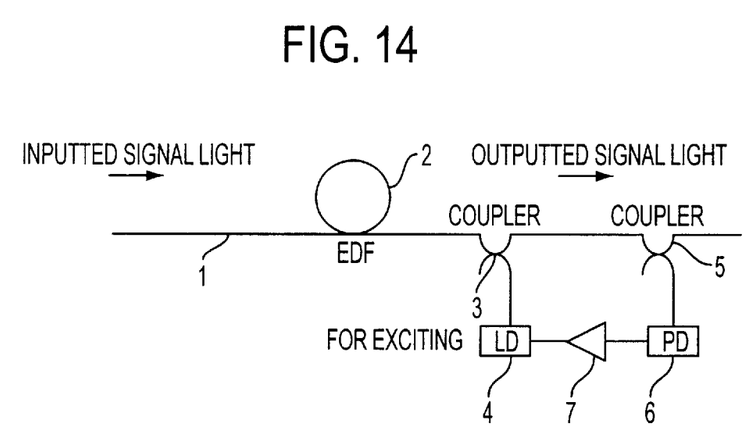
FIG. 14 shows a diagram indicating a basic structure of an optical amplifying repeater for an automatic level controller (ALC).

FIG. 14 shows a basic structure of an optical amplifying repeater having a function of ALC (Automatic Level Control), one of the objects of the present invention.

In FIG. 14, reference numeral "1" is an optical fiber transmission path. An optical fiber amplifier 2 is formed of an optical fiber, which is doped with rare-earth material, such as Erbium (Er).

In this example, a principle of the optical fiber amplifier 2 is the same as that of a laser. The Er doped fiber generates a predetermined Fermi energy level, at which strong adsorption occurs. Accordingly, when photons in an optical fiber are excited to the high Fermi energy level and thus the energy level of Er is reversed, a light having a wave-length corresponding to the difference between the high Fermi energy level and the low Fermi level is inputted and causes induced scattering in the optical fiber amplifier 2. In result, an amplified optical signal is output from the optical fiber amplifier 2.

In FIG. 14, reference numeral "3" is a coupler. For exciting photons in an optical fiber as described above, an exciting light outputted from a laser diode 4 is supplied to an optical fiber amplifier 2 via the coupler 3.

The amplified optical signal outputted from the optical fiber amplifier 2 branches in a coupler 5, and the branched signal is inputted to a photo diode unit 6. A photo diode provided in the photo diode unit 6 converts the amplified optical signal to a corresponding electrical signal. In the photo diode unit 6, the electrical signal outputted from the photo diode is further compared with a predetermined reference signal, and the difference between the electrical signal and the predetermined reference signal is supplied to an amplifier 7 to control a bias current for the laser diode 4. Thus, the output of the laser diode 4 is automatically level-controlled.

In this example, ALC (Automatic Level Control) means to control the optical output signal sent from the laser diode 4 for exciting the optical fiber amplifier 2 according to the input signal level, and control so as to keep the level of the output signal constant by changing an amplifying rate of the optical fiber amplifier 2.

Figure 15:
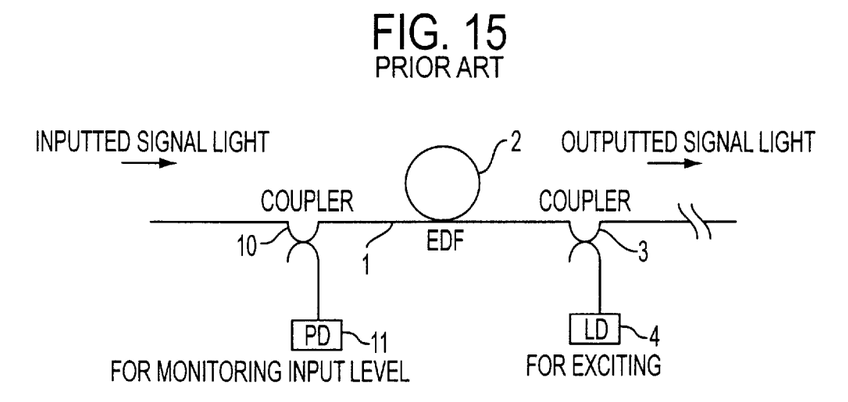
FIG. 15 shows an example of prior art.

On the other hand, the repeater employs a structure for monitoring input signal levels to detect faults generated on the optical fiber transmission paths. FIG. 15 shows a conventional structural example to monitor the input signal level. In FIG. 15, a coupler 10 is the input side of the optical fiber amplifier 2. An optical input signal branches at the coupler 10. The branched signal is inputted to a photo diode unit 11 for monitoring the input level.

The photo diode unit 11 for monitoring input level converts the optical input signal, which branched in the coupler 10, to an electrical signal to judge the input level of the signal. However, in the structure, when the level of the optical input signal is low, the level of the optical signal inputted to the photo diode 11 becomes lower in level, according to the branching in the coupler 10.

Accordingly, errors may become large in detecting the level of the optical input signal, which is converted to an electrical signal in the photo diode unit 11 and monitored. Conversely, if a branching ratio to the photo diode unit 11 becomes larger, a signal component, which is inputted to the optical fiber amplifier 2, becomes smaller, thus making deterioration of SN ratio (Signal-to-Noise ratio) larger. A branching ratio, such as 20:1, is selected as usual.

Figure 17:
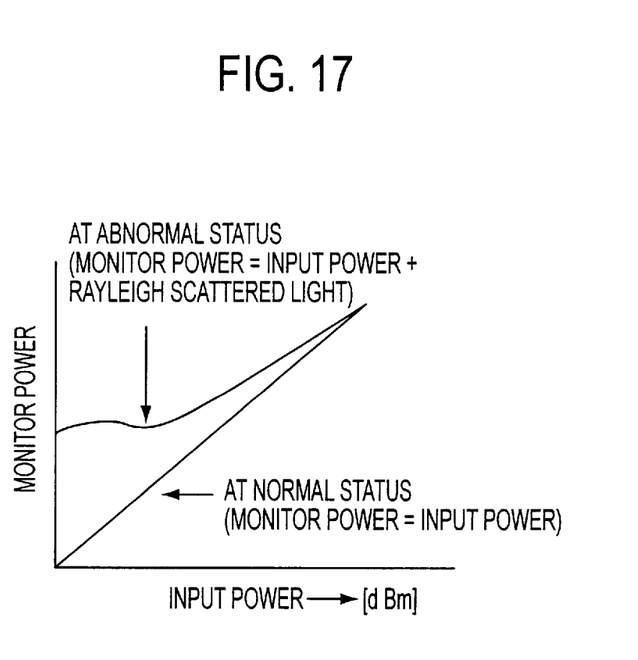
FIG. 17 is a diagram explaining obstruction of an input level monitor.

Further, an optical fiber for transmitting the signal sent from a signal light source is connected to the input side of the optical fiber amplifier 2 shown in FIG. 15. The optical fiber has the property, of reflecting slightly in the reverse direction; an incoming optical signal in an optical signal path, which is known so as Rayleigh scattering. The residual excited light, which is not used to amplify, leaks at the input side of the optical amplifier. Then, the leaked light goes back to the optical amplifier according to the Rayleigh scattering inside of the optical fiber for transmission, and enters to the photo diode for monitoring the input level with the signal light. Therefore, the input monitor value is not equal to an input power of the signal light, as shown in FIG. 17. Accordingly, the input power cannot normally be measured.

When the exciting light is supplied in the same direction as that of the signal light, namely by a forward excitation, the residual exciting light, which is not used to amplify, leaks at the output side of the optical fiber amplifier 2. Therefore, the leaked light is delivered to the next optical amplifier via an optical fiber for transmission. The residual excited light is input to the photo diode for monitoring the input level of the next amplifier with the signal light. Accordingly, it is also normally impossible to measure the input power at the next optical amplifier.

Figure 16:
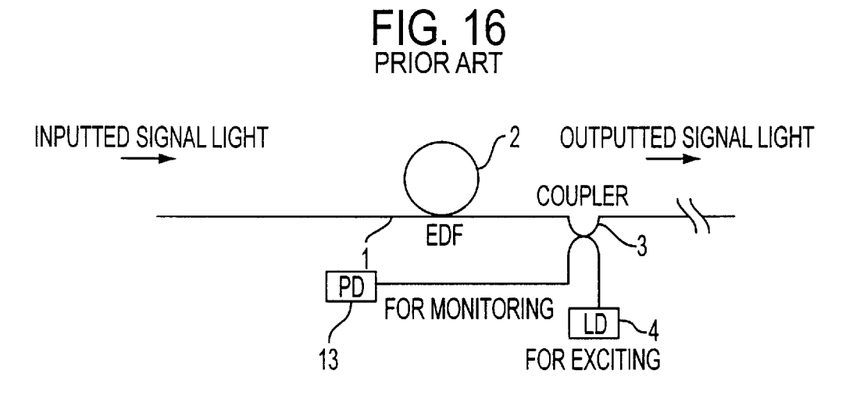
FIG. 16 shows another example of prior art.

FIG. 16 shows the other conventional structural example for monitoring the input signal level. As described above, the automatic level controller (ALC) controls the optical output signal of the laser diode 4 to change according to the input signal level. The photo diode 13 monitors the optical output of the laser diode 4, so that it becomes possible to equivalently find an optical input signal level.

However, in this structure, if the level of the optical input signal is large, light emission of the laser diode 4 becomes small to reduce an amplifying ratio of the optical fiber amplifier 2.

Accordingly, in a structure shown in FIG. 16, the level of the exciting light, which is inputted to the photo diode 13 for monitoring, and branches at the coupler 3, becomes smaller, whereas the error due to the result of monitoring becomes larger.

Figure 9:
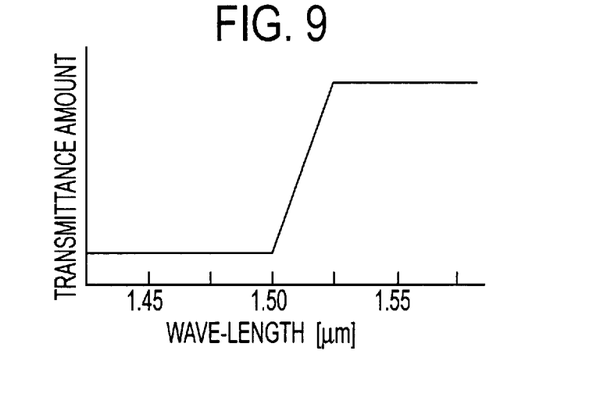
FIG. 9 shows a diagram indicating a characteristic of the optical filter.

As described above, in the conventional input monitoring system of the optical amplifying repeater, either of cases where the level of the optical input signal is low, that is, as shown in FIG. 15, and the level of the optical input signal is high, that is, as shown in FIG. 9, makes error in monitoring larger.

Therefore, if the optical input signal level varies over a wide range, it is impossible to accurately monitor the levels.

SUMMARY OF THE INVENTION

Accordingly, it is an object of the present invention to provide an input monitoring system of an optical amplifying repeater which is very accurate in monitoring the optical input signal, when the optical input signal level varies over a wide range.

An input monitoring system is provided in an optical amplifying repeater to monitor a level of an optical input signal. A monitored level of the optical input signal is used to detect a fault on an optical transmission path or to control a bias current for a laser diode which emits and supplies an exciting signal for exciting an optical fiber amplifier. To accurately monitor a level of the optical input signal, the input monitoring system according to the present invention comprises an input terminal supplied with the optical input signal, an optical fiber amplifier for amplifying the optical input signal, a first photo diode for detecting and outputting an electric signal corresponding to a level of the optical input signal, and an optical switch operatively connected to the input terminal, the optical fiber amplifier and first photo diode for switching the optical input signal alternatively into the optical fiber amplifier and the first photo diode.

Further objects of the present invention will become from the description of, embodiments according to the attached drawings.

DESCRIPTION OF THE PREFERRED EMBODIMENTS

Throughout the following descriptions, the same reference numerals are used to denote and identify corresponding or identical components.

Figure 1A:
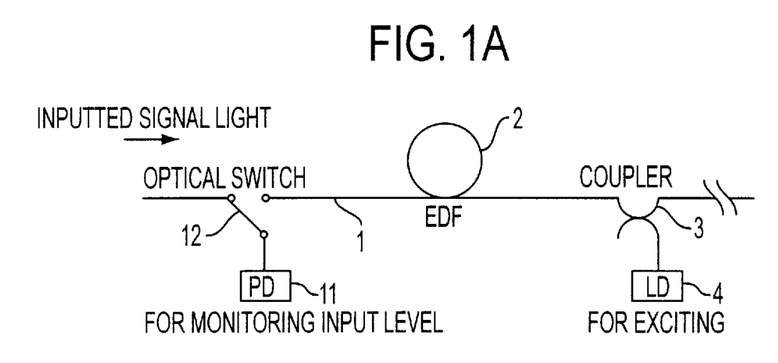
FIGS. 1A through 1C show a first embodiment of the present invention.
Figure 1B:
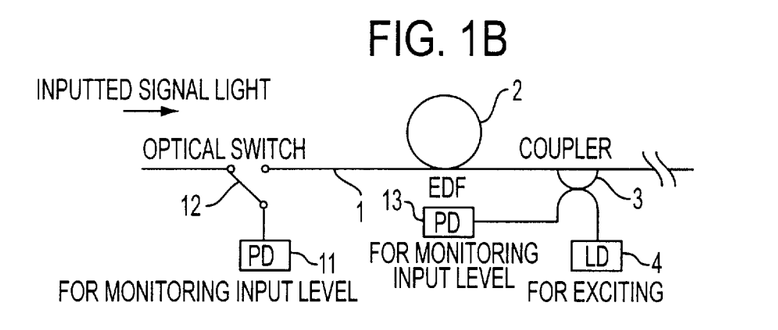
Figure 1C:
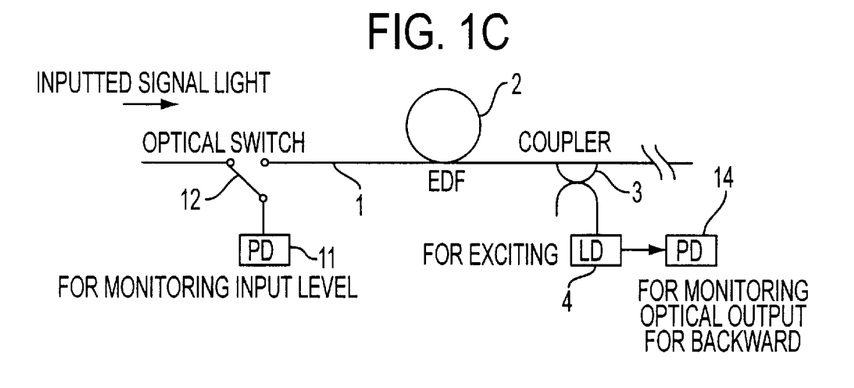

FIGS. 1A through 1C show a first embodiment of an input monitoring system for optical amplifying repeaters according to the present invention. In FIG. 1A, the system includes an optical switch 12 on the input side of an optical fiber amplifier 2. It is possible to input all amount of the optical input signal to a photo diode 11 for monitoring by switching an optical switch 12.

The optical switch 12 is the same as those employed in other embodiments, which are described later. Various types of optical switches, which have been developed in recent years, can be used as well as a mechanical switch, for the optical switch 12.

Consequently, it is possible to input an optical input signal to the photo diode 11 for monitoring, and reduce errors generated according to the result of monitoring, even if the level of the optical input signal is small, without further attenuating.

The structure shown in FIG. 1B further includes a photo diode 13. A exciting light output of the laser diode 4 branches into the photo diode 13 and is monitored therein, so that level of the optical input signal can be equivalently detected.

Figure 2:
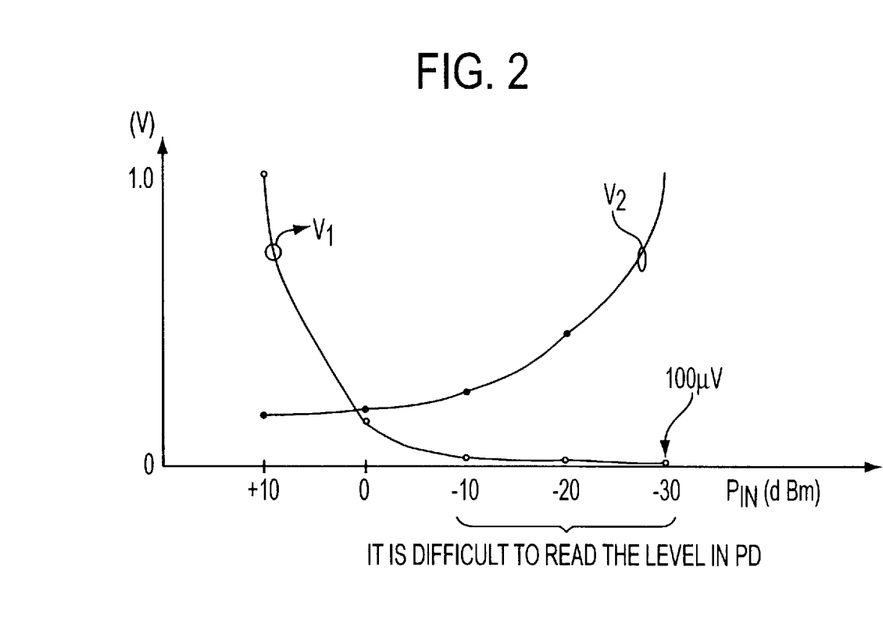
FIG. 2 is an operational explanatory diagram of the present invention.

Features of the level of an optical signal inputted to the photo diode 11, which is provided on the input side of the optical fiber amplifier 2, and of the level of an optical signal inputted to the photo diode 13, which monitors the branched, excited light of the laser diode 4 have been explained above, regarding the prior art. FIG. 2 shows the features of the input level of optical signals.

In FIG. 2, the abscissa shows the power in an optical input signal (P in dBm). Further, V1 indicates output voltages converted by the photodiode 11 from optical input signals. V2 also indicates voltages converted by the photo diode 12 for monitoring from the exciting light emitted in the laser diode 4.

Figure 3:
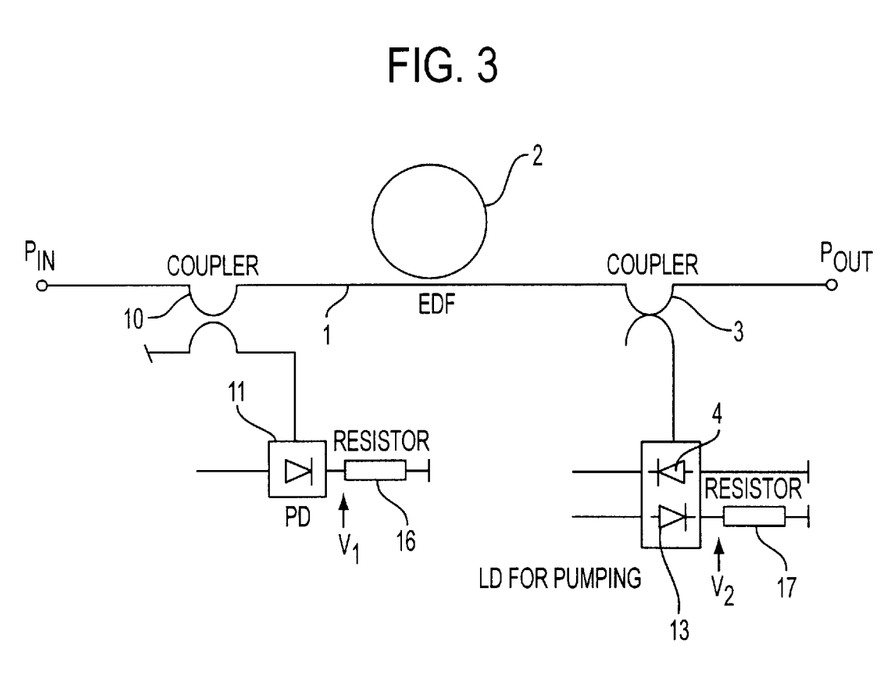
FIG. 3 is a diagram showing a second embodiment of the present invention.

Positions for measuring the voltages V1 and V2 are as shown in FIG. 3. The voltage V1 appears across a resistor 16 by current flowing to the photo diode 11 for monitoring according to an optical input signal.

The voltage V2 is a voltage appearing across the resistor 17 by flowing a current converted by the photo diode 13 from a light output emitted by the laser diode 4, to which the photo diode 13 is coupled as a pair.

Returning now back to FIG. 2, the voltage V1, which indicates an output of the photo diode 11, becomes smaller, as the optical input signal level becomes smaller. The minimum value is near 100 MV, which means that it is difficult to detect the level of the optical input signal in the photo diode 13 for monitoring.

Conversely, the level of the voltage V2 that indicates converted outputs by the photo diode 13 for monitoring the emitted light from the laser diode 4 becomes larger, as the level of the optical input signal becomes smaller, according to the reason described above.

Accordingly, in the present embodiment shown in FIG. 1B, to employ the features of voltages V1 and V2 efficiently, when an optical input signal becomes larger, the output from the photo diode 11 for monitoring on the input side is monitored, while the optical input signal becomes smaller, the switch is controlled to monitor output voltage V2 of the photo diode 13, which detects an exciting light of the laser diode 4.

Therefore, in comparison with the conventional system, it becomes possible to monitor the input level over a wider dynamic range of an optical input signal.

FIG. 1C shows a structure, in which power of the laser diode 4 in a backward direction is monitored by the photo diode 14. The explanations relating to FIGS. 2 and 3 are commonly applied to the structure to overcome the conventional drawbacks.

Figure 4A:
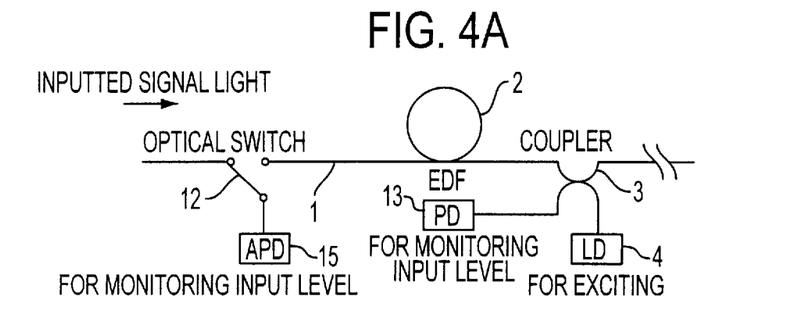
FIGS. 4A and 4B show a third embodiment of the present invention.
Figure 4B:
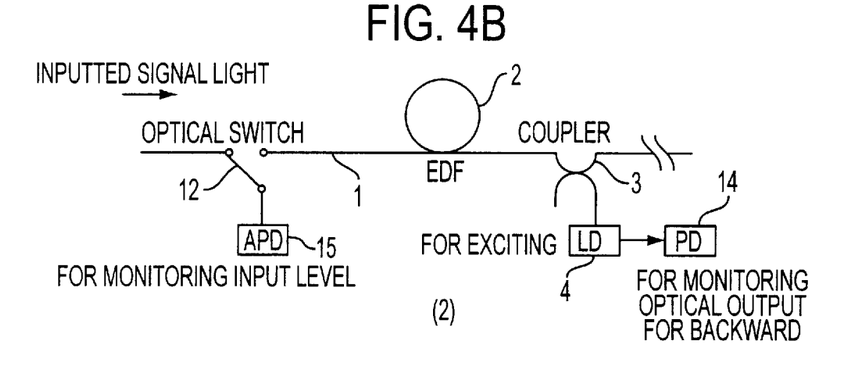

FIGS. 4A and 4B further show an embodiment according to the present invention. Structures shown in FIGS. 4A and 4B, as a basic structure, are the same as those shown in FIGS. 1A to 1C. However, one difference is that an avalanche photo diode 15, of which amplifying rate is more than "1", is employed instead of the photo diode 11 for monitoring, which is located on the input side of the optical fiber amplifier 2. Thereby, it is possible to monitor the level of an optical input signal with a low error rate, even if the level of the optical input signal is small.

Other structures and functions are the same as those explained in FIG. 1, so that the explanations will be now abbreviated for simplicity.

Figure 5A:
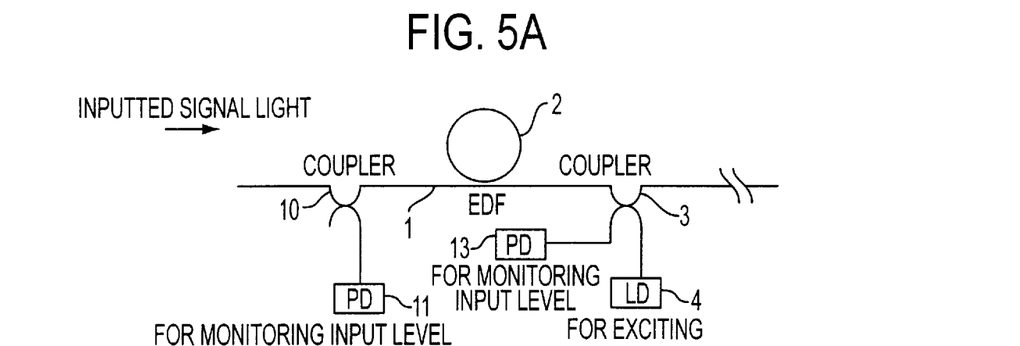
FIGS. 5A and 5B show a fourth embodiment of the present invention.
Figure 5B:
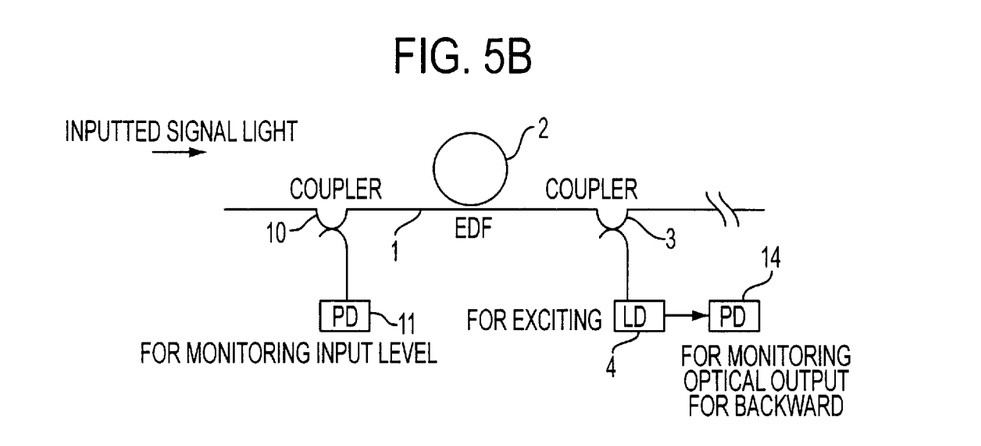

FIGS. 5A and 5B show another embodiment of the present invention. The embodiment shown in FIGS. 5A and 5B is different from the above-described embodiments in that, a coupler 10 is provided instead of the optical switch 12, which is located on the input side of the optical fiber amplifier 2 on the structure.

The embodiment shown in FIGS. 5A and 5B, enabling more accurate monitoring of the level of an optical input signal, has a photodiode 13 (FIG. 5A), which monitors a light output emitted by the laser diode 4 for excision, or a photodiode 14 (FIG. 5B), which monitors the light output of the laser diode 4 in a backward direction, in correspondence with FIGS. 1B and 1C. The reason is, therefore, the same as that explained in conjunction with FIGS. 2 and 3.

Figure 6A:
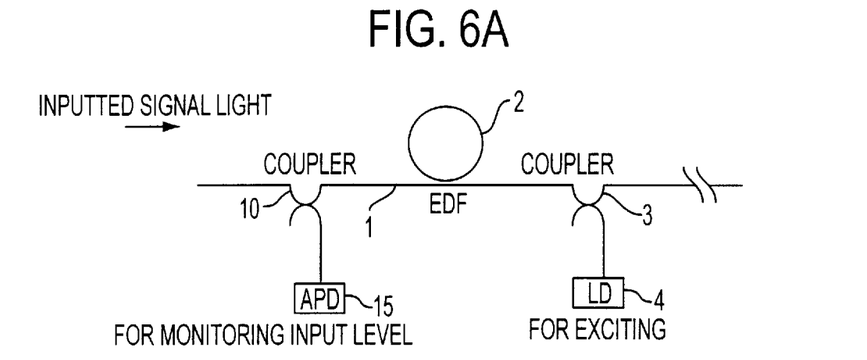
FIGS. 6A through 6C show a fifth embodiment of the present invention.
Figure 6B:
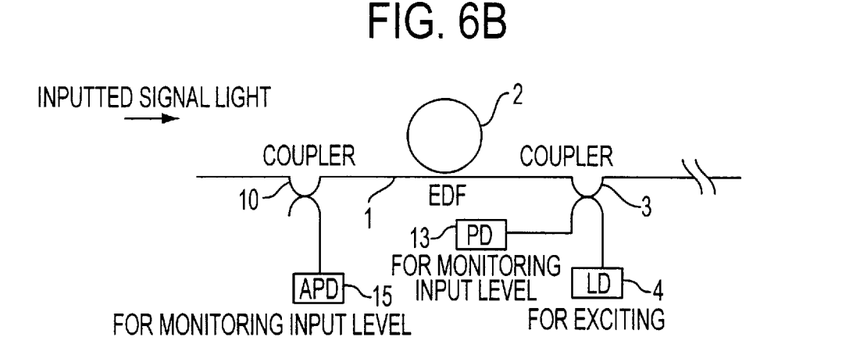
Figure 6C:
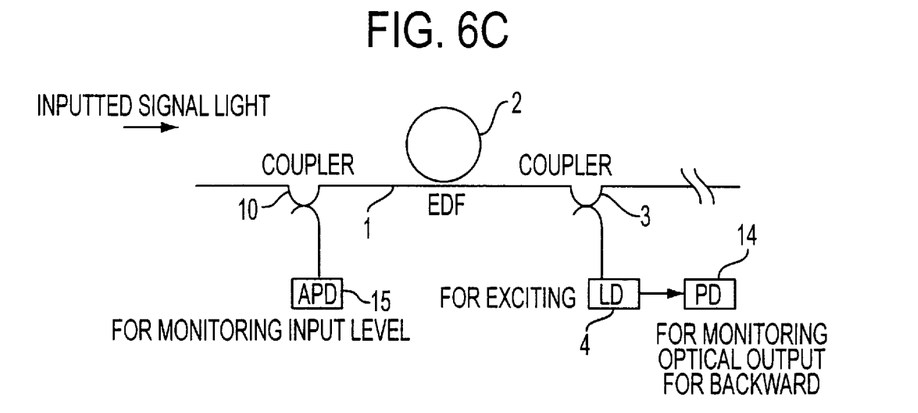

FIGS. 6A through 6C show a fifth embodiment, which is further modified from the embodiment of FIGS. 5A and 5B. That is, a coupler 10 is provided on the input side of the optical fiber amplifier 2, and a photo diode 11 for monitoring an input signal level is replaced by an avalanche photo diode 15, of which the amplifying rate is more than "1". Thereby, it becomes possible to effectively monitor the level of an optical input signal without errors, even if the level of the optical input signal is small.

Accordingly, as shown in the example of FIG. 6A, when it is sufficient enough to monitor the optical input signal by the avalanche photo diode 15, it is possible to omit a photo diode 12, which monitors a light output emitted by the laser diode 4 for excision, or a photo diode 13, which monitors the backward output of the laser diode 4 for excision on the output side of the optical fiber amplifier 2.

FIGS. 6B and 6C are respectively corresponding to FIGS. 5A and 5B, in which the photo diode 11 is replaced to an avalanche photo diode 15. Thereby, it becomes possible to more accurately monitor the optical input signal.

Figure 7:
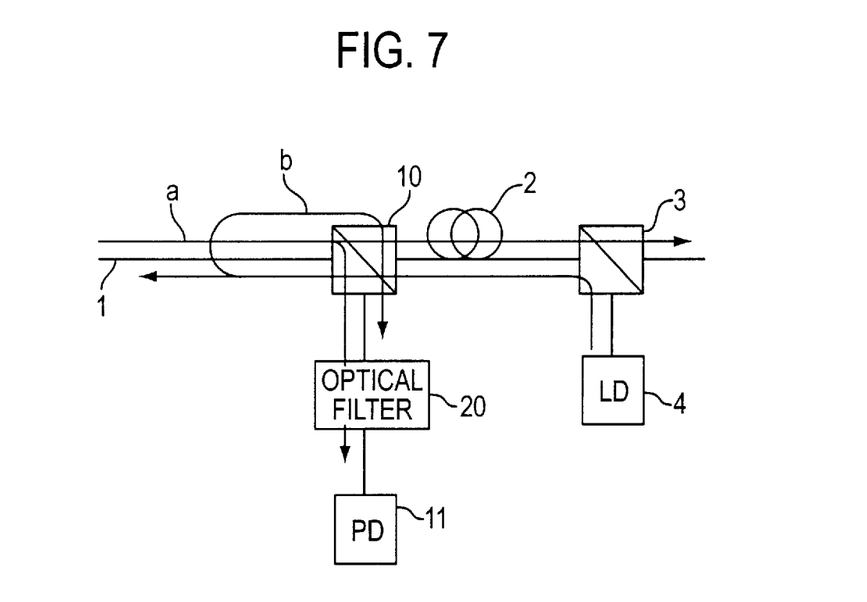
FIG. 7 shows a sixth embodiment of the present invention.

FIG. 7 further shows another embodiment of the present invention. In the diagram shown in FIG. 7 an optical filter 20, which removes residual excited lights, is provided in the previous stage of a photo diode 11 for monitoring the input level.

A part of an optical input signal a of 1.55 μm, which is sent from the optical fiber transmission path 1, branches at the coupler 10. The branching signal is inputted to a photo diode 11 to monitor the input level of the optical input signal. The exciting light b of 1.48 μm, which is emitted by the laser diode 4, is inputted to an optical fiber amplifier 2, via a wave-length multiplying coupler 3. However, a part of the light is leaked to the optical fiber transmission path 1 as a residual exciting light. Further, a part of the residual exciting light returns as Rayleigh scattered light, but it is blocked by the optical filter 20, and is not inputted to the photo diode for monitoring the input level.

Figure 8:
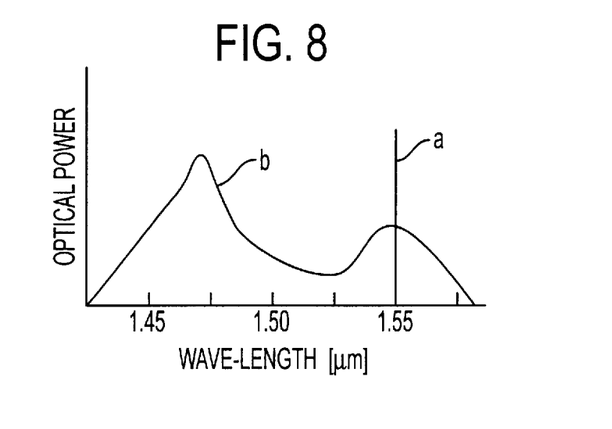
FIG. 8 shows a diagram indicating an input spectrum to an optical filter.

As shown in FIG. 8, both the residual exciting light b besides the signal light a input to the optical fiber 20.

Figure 10:
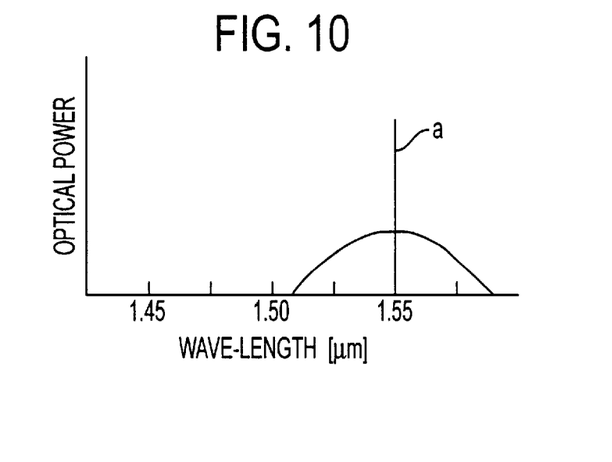
FIG. 10 shows a diagram indicating an output spectrum of the optical filter.

However, the optical filter 20 has a transmission characteristic, as shown in FIG. 9. Therefore, the light of which the wave-length is less than 1.50 μm, is removed thus removing the residual exciting light, as shown in FIG. 10. Accordingly, it becomes possible to monitor the level of an optical input signal accurately.

A long wave-length pass filter, a band-stop filter for the 1.48 μm wave-band, a band-pass filter for 1.55 μm wave-band or an optical blanching device, which can pass the light of 1.55 μm, can be employed as an optical filter. Further, a bulk type filter, which employs a dielectric multi-layered film, or a fiber type filter, which has a filter characteristic due to cutting or fusing a fiber, can be used as an optical filter.

Furthermore, it is possible to accurately monitor the level of an optical input signal by providing the optical filter, even in the case of forward exciting.

Figure 11:
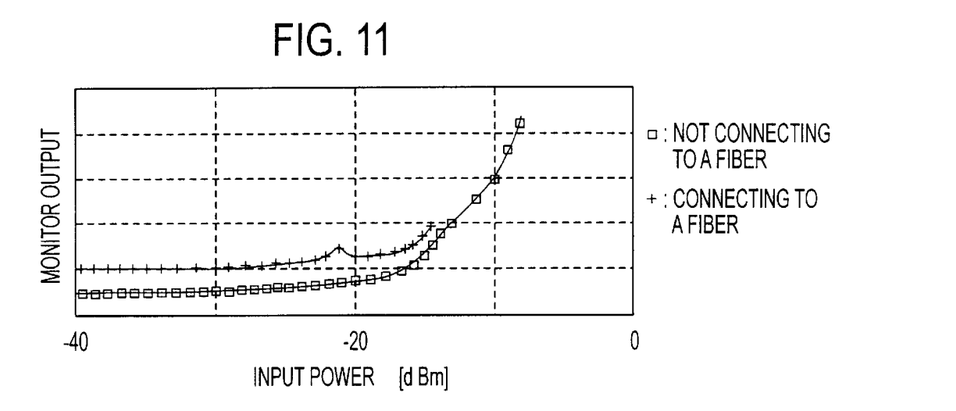
FIG. 11 shows a diagram indicating a characteristic of a conventional input power monitor.

FIG. 11 shows a characteristic diagram of an input power monitor for an optical direct amplifier corresponding to FIG. 8.

In FIG. 11, square marks (□) show data measured in the case where an optical fiber for transmission, over a distance of several meters to several hundred meters, is not connected. Plus marks (+) show data measured in the case where the optical fiber for transmission is connected.

When the optical fiber for transmission is connected, the residual exciting light goes back to the optical amplifier through the optical fiber, because of Rayleigh scattering. In this case, the characteristic of the input power monitor indicates a rising portion on a characteristic line, with the result that it is difficult to accurately measure an input power level, and thus as shown in FIG. 11, values less than the rising portion cannot be measured at all.

Figure 12:
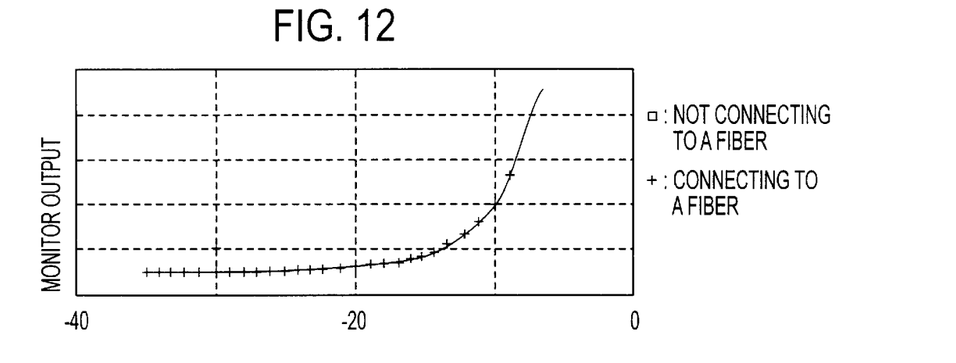
FIG. 12 shows a diagram indicating a characteristic of an input power monitor according to the present invention.

If the optical fiber is not connected, no problem is brought for monitoring an input power, but the optical direct amplifier is provided to transmit an optical signal for a long distance, and therefore, an optical fiber is indispensable for transmitting the optical signal. [61] FIG. 12 shows a characteristic of the input power monitor when removing the influence of the residual exciting light by the system according to the present invention. In FIG. 12, a solid line shows data that are measured in the case where an optical amplifier having a structure shown in FIG. 11 is employed and the optical fiber for transmission is connected. Plus marks (+) show data that are measured on the status where the optical fiber for transmission is connected. In FIG. 12, there is almost no difference between two cases. It is apparent from FIG. 12 that the influence of the residual exciting light can be removed.

Figure 13:
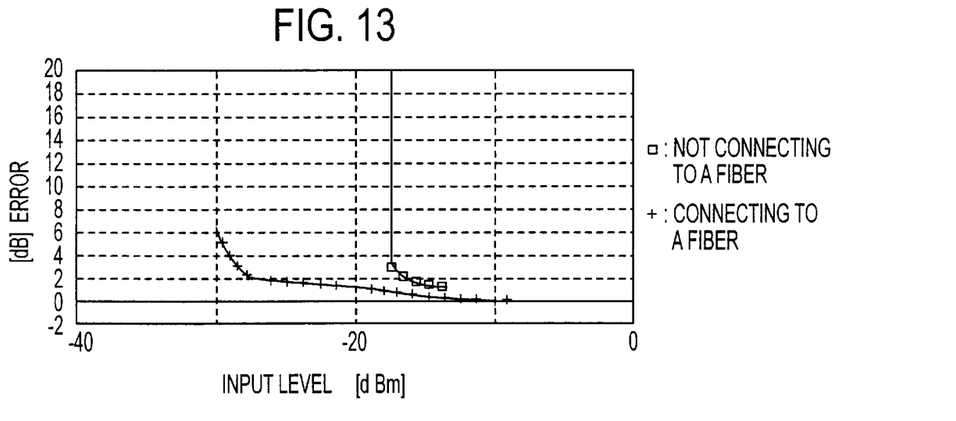
FIG. 13 shows a diagram indicating an error of an input power monitor.

FIG. 13 represents graphically errors of measurement due to the influence of the residual exciting light of the input level monitor shown in FIGS. 11 and 12. Square marks (□) show the influence of the residual exciting light when there is no filter on a PD. The input level, which is less than 17 dBm, becomes infinite and thus impossible to measure. Conversely, when a filter is connected to the PD, which is indicated by a plus mark (+), the input level, which is −20 dBm, can be within 1 dB of errors. Further, the data, which is less than 25 dBm, can be measured.

As explained according to the embodiments, the present invention makes it possible to monitor an optical input signal adaptively, even if the level of the optical input signal level is small.

Therefore, it is possible to monitor the optical input signal without errors in a wider dynamic range.

What is claimed is:

1. An input monitoring system provided in an optical amplifying repeater for monitoring a level of an optical input signal, the input monitoring system comprising:

an input terminal supplied with the optical input signal; an optical fiber amplifier for amplifying the optical input signal, wherein said optical fiber is formed of an Erbium doped fiber;

a first photo diode for detecting and outputting an electric signal corresponding to a level of the optical input signal;

an optical switch operatively connected to the input terminal, the optical fiber amplifier and first photo diode for switching the optical input signal alternatively into the optical fiber amplifier and the first photo diode;

a coupler operatively connected to an output side of the optical fiber amplifier;

a laser diode for emitting and supplying an optical exciting light to the optical fiber amplifier via the coupler; and a second photo diode operatively coupled to the coupler for detecting a part of the optical exciting light emitted from the laser diode.

2. The input monitoring system according to claim 1, wherein the first photo diode is an avalanche photo diode having an amplifying rate of more than "1".

3. An input monitoring system provided in an optical amplifying repeater for monitoring a level of an optical input signal, the input monitoring system comprising:

an input terminal supplied with the optical input signal;

an optical fiber amplifier for amplifying the optical input signal, wherein said optical fiber is formed of an Erbium doped fiber;

a first photo diode for detecting and outputting an electric signal corresponding to a level of the optical input signal;

an optical switch operatively connected to the input terminal, the optical fiber amplifier and first photo diode for switching the optical input signal alternatively into the optical fiber amplifier and the first photo diode;

a coupler operatively connected to an output side of the optical fiber amplifier;

a laser diode for emitting and supplying an optical exciting light to the optical fiber amplifier via the coupler; and a second photo diode operatively coupled to the coupler for detecting the optical exciting light emitted from the laser diode in a backward direction.

4. The input monitoring system according to claim 3, wherein the first photo diode is an avalanche photo diode having an amplifying rate of more than "1".

5. An input monitoring system provided in an optical amplifying repeater for monitoring a level of an optical input signal, the input monitoring system comprising:

an input terminal supplied with the optical input signal;

an optical fiber amplifier formed of an Erbium doped fiber for amplifying the optical input signal;

a first photo diode for detecting and outputting an electric signal corresponding to a level of the optical input signal;

a first coupler connected to the input terminal, at which the optical input signal branching to the optical fiber amplifier and the first photo diode;

a second coupler operatively connected to an output side of the optical fiber amplifier;

a laser diode for emitting and supplying an optical exciting light to the optical fiber amplifier via the first coupler; and a second Photo diode operatively coupled to the first coupler for detecting a part of the optical exciting light emitted from the laser diode.

6. The input monitoring system according to claim 5, wherein the first photo diode is an avalanche photo diode having an amplifying rate of more than "1".

7. An input monitoring system provided in an optical amplifying repeater for monitoring a level of an optical input signal, the input monitoring system comprising:

an input terminal supplied with the optical input signal;

an optical fiber amplifier for amplifying the optical input signal;

a laser diode for emitting and supplying an optical exciting light to the optical fiber amplifier;

a photo diode for detecting and outputting an electric signal corresponding to a level of the optical input signal;

branching means for receiving the optical input signal, and outputting branching signals for the optical fiber amplifier and the photo diode;

an optical filter connected between the photo diode and the branching means for removing a component of the exciting light emitted by the laser diode from the output of the branching means to supply only the component of the optical input signal to the photo diode; and a second photo diode operatively coupled to an output of the optical fiber amplifier for detecting part of the optical exciting light emitted from the laser diode.

8. The input monitoring system according to claim 7, wherein the optical fiber amplifier is formed of an Erbium doped fiber.

9. An input monitoring system provided in an optical amplifying repeater for monitoring a level of an optical input signal, the input monitoring system comprising:

an input terminal supplied with the optical input signal;

an optical fiber amplifier formed of an Erbium doped fiber for amplifying the optical input signal;

a first photo diode for detecting and outputting an electric signal corresponding to a level of the optical input signal;

a first coupler connected to the input terminal, at which the optical input signal branching to the optical fiber amplifier and the first photo diode;

a second coupler operatively connected to an output side of the optical fiber amplifier;

a laser diode for emitting and supplying an optical exciting light to the optical fiber amplifier via the first coupler; and a second photo diode operatively coupled to the first coupler for detecting the optical exciting light emitted from the laser diode in a backward direction.

10. The input monitoring system according to claim 9, wherein the first photo diode is an avalanche photo diode having an amplifying rate of more than "1".

* * * * *